Sept. 1, 1942.  M. C. OVERMAN  2,294,626

NONSKID TIRE

Filed Dec. 29, 1938

INVENTOR.
Max C. Overman

BY
John V. Hoag.
ATTORNEY.

Patented Sept. 1, 1942

2,294,626

UNITED STATES PATENT OFFICE 2,294,626

NONSKID TIRE

Max C. Overman, New York, N. Y.

Application December 29, 1938, Serial No. 248,185

2 Claims. (Cl. 152—209)

This invention relates to a flexible tire tread, comprising spaced substantially circumferential ribs, characterized by its tendency when in contact with the road surface to close the space between the ribs against the entrance of stones, nails, and other damaging extraneous matter.

In carrying out my invention I employ undercut ribs i. e. ribs inclined outwardly toward the road bearing surface and adapted to expand laterally under load, combined in alternate relation with so called "draft" ribs i. e. ribs which are inclined inwardly toward the road bearing surface. In the preferred form of my invention the undercut ribs are so much narrower at the base than the draft ribs that they are substantially non-load bearing.

Under load the width of the undercut ribs adjacent the tread surface is greatly increased causing the ribs to abut, or approach close to, the adjoining draft ribs, thereby substantially closing the space between ribs at the tread surface. Because of their high degree of flexibility the undercut ribs constitute effective wiper members to clean the road surface upon the inception of skidding.

The invention will best be understood if the following description is read in connection with the accompanying drawing in which.

Figure 1:
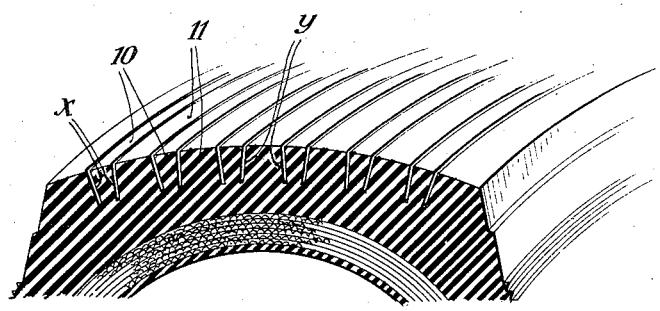
Figure 1 is a perspective view showing substantially non-load supporting undercut i. e., outwardly inclined, ribs employed as wiper members, in combination with draft i. e., inwardly inclined, load bearing ribs.

In Figure 1 I have illustrated a tire tread having the outwardly inclined, or undercut ribs 10, and the inwardly inclined, or draft ribs 11, spaced apart laterally and positioned in alternate relationship.

Figure 2:
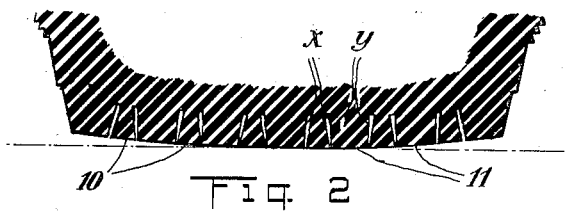
Figure 2 is a cross sectional view illustrating the tendency of my improved tread to close the spaces between the ribs upon contact with the road surface.

As illustrated the outward inclination of the side walls x of the ribs 10 is made to conform to the inward inclination of the side walls y of ribs 11 so that the space between adjoining ribs 10 and 11 is substantially the same from the base to the tread surface when the tire is not under load. Under load the ribs 10 are adapted to distort laterally to a high degree adjacent the tread surface thus abutting against, or approaching near to the adjoining draft ribs. The tendency of the ribs 10 and 11 to close the spaces between them when subjected to load is illustrated in Figure 2 wherein the side walls x and y are shown in abutting relation at the tread surface of the tire. While in practice the side walls of ribs 10 and 11 may not be in actual contact at all times under load, depending on the amount of the load, the size of the ribs, the spacing between ribs when not under load, and the degree of inclination of the side walls of the ribs, it will be apparent that the tread disclosed in Figures 1 and 2 will at all times under load tend to be self-closing.

As shown in Figure 1, the ribs 10 at the base are much narrower than the draft ribs 11 which are of a size to support all normal loads without collapsing. The ribs 10 are substantially without load supporting function. Because of their high degree of flexibility and lateral instability they are, however, well adapted to facilitate the engagement of the load supporting ribs and the road surface, to prevent skidding. At the inception of skidding they readily bend thus bringing an edge of the tread surface into contact with the road surface thereby exerting an effective wiping action on drops of water, sand, or other substances which might otherwise lessen the adhesion between the ribs 11 and the road surface.

Figure 3:
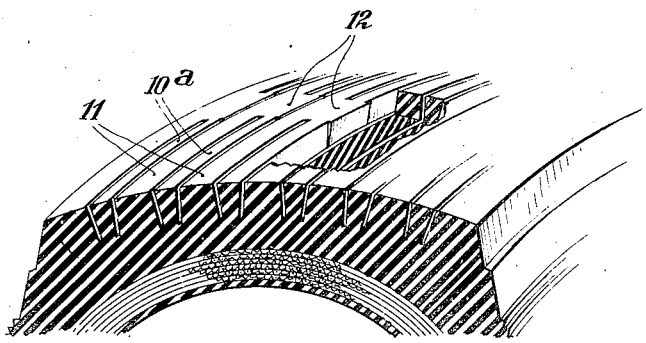
Figure 3 is a perspective view partly in cross section showing undercut ribs combined with draft ribs which have lateral projections of greater width than the undercut ribs.

In Figure 3 the draft ribs 11 and the undercut ribs 10a are combined alternately as in Figure 2, but the load bearing ribs 11 are provided at intervals with lateral projections 12 which extend laterally into proximity to the next load bearing rib 11. When the tread is distorted laterally a predetermined degree the extensions 12 abut against the next adjacent rib 11 thereby bridging the space between ribs 11 and buttressing them against excessive lateral distortion. The ribs 10a as described above, tend to close the spaces between the ribs at the tread surface except at the places where protuberances 12 are located, and at these places the spaces are substantially closed at all times by the protuberances 12 themselves. The ribs 10a, between protuberances 12, serve as wiper members on the road surface upon the inception of skidding, as described above. The ribs 10a may be integral with the protuberances as illustrated or they may be disconnected and spaced therefrom.

Figure 4:
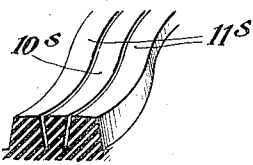
Figure 4 is a detail perspective view, partly in cross section, of a portion of a tire tread showing serpentine ribs employing undercut and draft ribs.

In Figure 4 undercut serpentine ribs 10s are shown combined with serpentine draft ribs 11s. This modification in all or part of the tread may be desirable where a high degree of traction is desired.

Tire treads made up according to my invention have the advantage of durability and freedom from puncture due to their ability to exclude damaging objects such as sharp pieces of slate, nails, and other extraneous matter from entering the spaces between the ribs.

What I claim is:

1. A tire tread comprising circumferentially extending ribs inclined inwardly toward the top, each of said ribs having a multiplicity of lateral projections spaced from one another by short intervals around the entire length of said rib, said lateral projections extending to within a short distance from the adjoining rib with inwardly inclined side walls, and other circumferentially extending ribs inclined outwardly, from the base to the top, positioned in spaces between the said ribs having inwardly inclined side walls and between the said lateral projections extending into the said spaces between said ribs with inwardly inclined side walls, said lateral projections extending laterally beyond the side walls of said ribs having their widest portion adjacent to the tread surface.

2. A tire tread comprising circumferentially extending ribs inclined inwardly toward the top, each of said ribs having a multiplicity of lateral projections spaced from one another by short intervals around the entire length of said rib, said lateral projections extending to within a short distance from the adjoining rib with inwardly inclined side walls, and other flexible and laterally unstable ribs having their widest portion adjacent to the tread surface, positioned in spaces between the ribs having inwardly inclined side walls and between the said lateral projections extending into the said spaces between said ribs with inwardly inclined side walls, said lateral projections extending laterally beyond the side walls of said ribs having their widest portion adjacent to the tread surface, both said kinds of ribs having continuous peripheral surfaces and steeply inclined side surfaces having a straight generatrix.

MAX C. OVERMAN.